US007343127B2

(12) United States Patent
Yamada et al.

(10) Patent No.: US 7,343,127 B2
(45) Date of Patent: Mar. 11, 2008

(54) MARK FORMING METHOD FOR MOVING BODY AND MOVING BODY HAVING MARK

(75) Inventors: Yasufumi Yamada, Kanagawa (JP); Koichi Kudo, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 146 days.

(21) Appl. No.: 11/269,802

(22) Filed: Nov. 9, 2005

(65) Prior Publication Data

US 2006/0120740 A1 Jun. 8, 2006

(30) Foreign Application Priority Data

Nov. 11, 2004 (JP) ............................ 2004-328025

(51) Int. Cl.
*G03G 15/01* (2006.01)
*B41J 2/385* (2006.01)
*G01D 15/06* (2006.01)

(52) U.S. Cl. ...................................... 399/301; 347/116

(58) Field of Classification Search .................. 399/49, 399/301; 347/116; 430/47.2
See application file for complete search history.

(56) References Cited

U.S. PATENT DOCUMENTS 5,896,472 A * 4/1999 Takayama ............... 347/116 X
6,008,826 A * 12/1999 Foote et al. ................ 347/116
6,101,359 A * 8/2000 Tamura ...................... 399/301
6,285,849 B1 * 9/2001 Shimada et al. ............ 399/301

FOREIGN PATENT DOCUMENTS

| | | |
|---|---|---|
| JP | 6-263281 | 9/1994 |
| JP | 9-114348 | 5/1997 |
| JP | 3107259 | 9/2000 |
| JP | 2004-99248 | 4/2004 |
| JP | 2004-202498 | 7/2004 |
| JP | 2004-262571 | 9/2004 |

OTHER PUBLICATIONS

U.S. Appl. No. 11/169,780, filed Jun. 30, 2005, Koichi Kudo et al.

* cited by examiner

*Primary Examiner*—Sandra L. Brase
(74) *Attorney, Agent, or Firm*—Oblon, Spivak, McClelland, Maier & Neustadt, P.C.

(57) ABSTRACT

A mark forming method for a moving body is disclosed. The method includes the steps of forming a second material layer, which scatters second wavelength light by being dispersed a first material that has a light absorbing property for first wavelength light therein, on a moving body; irradiating the first wavelength light on a part of the second material layer, making the first material at the part absorb the first wavelength light, and changing a scattering property of the part of the second material layer; and forming a mark whose scattering property for the second wavelength light is different in the part.

12 Claims, 6 Drawing Sheets

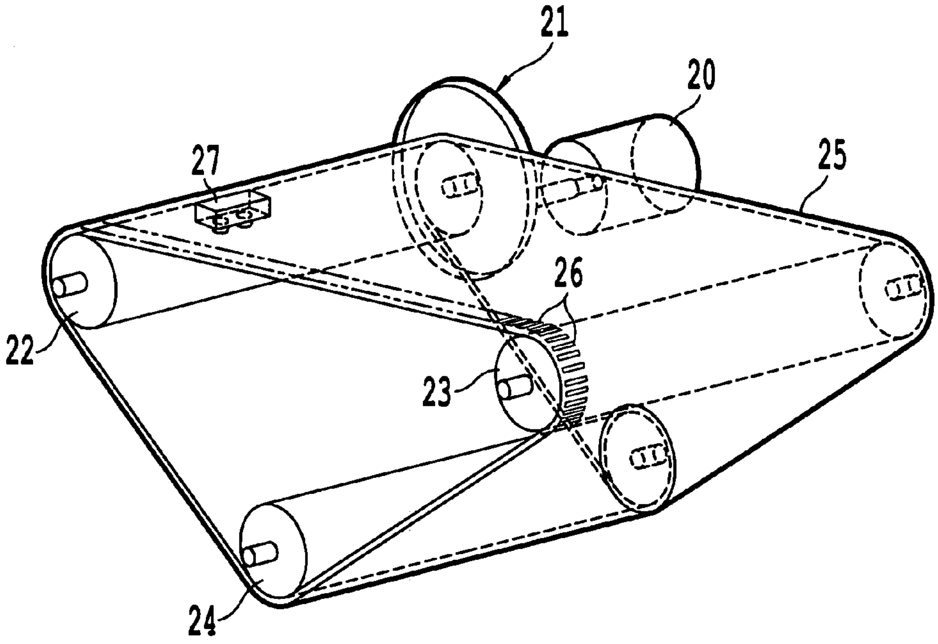
Fig.3(a)
PRIOR ART
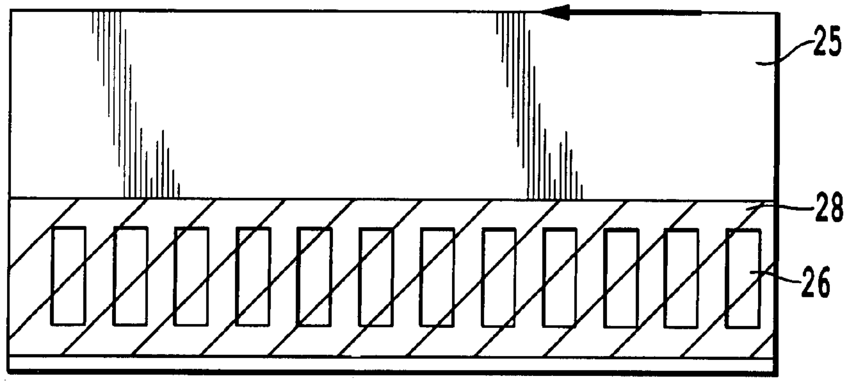
Fig.(3b)
PRIOR ART

MARK FORMING METHOD FOR MOVING BODY AND MOVING BODY HAVING MARK

BACKGROUND OF THE INVENTION

1. Field of the Invention

The present invention generally relates to a mark (pattern) forming method for a moving body by using a laser beam with high accuracy and a moving body having a highly accurate mark; and in detail, relates to a rotating body having a mark for an image forming apparatus such as a photoconductor belt, a transfer belt, a paper carrying belt, a photoconductor drum, a transfer drum, and so on in an image forming apparatus such as a copying machine, a printer, and a facsimile. The present invention can be also applied to a positioning sensor and a pattern forming method.

2. Description of the Related Art

In an image forming apparatus which provides rotating bodies for forming an image such as a photoconductor belt and an intermediate transfer belt, in order to accurately align an image on a transfer material carried by a rotating movement unit of the rotating body, it is required that a moving amount and a moving position of the rotating movement unit of the rotating body be controlled with high accuracy. However, when the rotational speed of the rotating body is changed for some reason, the moving amount and the moving position of the rotating movement unit of the rotating body are also changed. Consequently, it is difficult to control a position difference of the image on the transfer material carried by the rotating movement unit with high accuracy.

Conventionally, in order to accurately control the position difference of the image caused by the moving speed change of the rotating movement unit of the rotating body, a rotary encoder is directly connected to the rotational axle of a driving roller of an endless belt type moving body such as a transfer belt and a paper carrying belt and to the rotation axle of a cylindrical member such as a photoconductor drum, and the rotational speed of a driving motor being driving means of the rotating body is controlled based on the rotational speed of the rotating body detected by the rotary encoder. Such an image forming apparatus is disclosed in Japanese Laid-Open Patent Application No. 6-175427. This image forming apparatus indirectly controls the moving amount (moving position) of the rotating movement unit of the rotating body by controlling the rotational speed of the rotating body.

In Japanese Laid-Open Patent Application No. 6-263281 (Patent Document 1) and Japanese Laid-Open Patent Application No. 9-114348 (Patent Document 2), a method is disclosed where marks are formed on a belt surface and the belt surface speed is calculated by a pulse interval obtained by detecting the marks with a sensor, and this calculated result is fed back to the control of the belt surface speed. According to this method, since the movement of the belt surface can be directly observed, the moving amount can be directly controlled.

The above conventional technologies do not specifically teach a method of forming marks on the belt surface, and do not make problems occurring during an actual use clear. As an actual example of the marks, it is considered that holes are formed as marks in the belt and are detected by a transmission type sensor. However, when the holes are formed, tensile strength of the hole forming parts is extremely decreased and stretching frequently occurs, compared with the other parts. Consequently, a correct belt carrying state cannot be obtained, a stress is concentrated on and a crack occurs in the hole forming parts, and there is danger of the belt breaking.

In addition, when the marks formed by the holes or reflection marks each formed by a metal reflection film are used, a leakage current occurs between the photoconductor body and the intermediate transfer belt to which high electric charge is applied. Therefore, a bad influence is given to the transfer process, and this may cause a breakdown of the apparatus.

A subject of the present invention is explained using a color image forming apparatus as an example.

First, referring to FIG. 1, a color image forming apparatus suitable to a case to which the present invention is applied is explained. This color image forming apparatus is a so-called tandem type apparatus in which plural electronic processing units 1K, 1M, 1Y, and 1C are arrayed in order from an upstream side of a moving direction (carrying direction) of a carrying belt 3, along the carrying belt 3 that carries a paper 2 to which an image is transferred as a recording medium. Each of these electronic processing units 1K, 1M, 1Y, and 1C, functions as an image forming unit. The electronic processing unit 1K forms a black image, the electronic processing unit 1M forms a magenta image, the electronic processing unit 1Y forms a yellow image, and the electronic processing unit 1C forms a cyan image. The internal structure is the same in each of them but the forming color images are different among them. Therefore, in the below explanation, structural elements of the electronic processing unit 1K for the black image are specifically explained, the specific explanations for the electronic processing units 1M, 1Y, and 1C are omitted, and elements with the signs M, Y, and C attached are only shown in the drawing.

The carrying belt 3 is an endless belt movably held by carrying rollers 4 and 5; one of them being a driving roller which drives the rotation and the other being a driven roller, and the carrying belt is rotated in an arrow direction by the rotations of the carrying rollers 4 and 5. A paper feeding tray 6 in which the paper 2 is stored is disposed under the carrying belt 3, and the paper 2 at the uppermost position being stored in the paper feeding tray 6 is sent out and is adhered to the carrying belt 3 by an electrostatic force at the time of image forming. The paper 2 adhered to the carrying belt 3 is carried to the first electronic processing unit 1K and a black image is transferred to the paper 2.

The above electronic processing unit 1K for the black image includes a photoconductor drum 7K being an image carrier; and a charger 8K, an exposing unit 9K, a developing unit 10K, and a photoconductor cleaner 11K disposed around the photoconductor drum 7K. A laser scanner is used as the exposing unit 9K, and the exposing unit 9K is structured so that a laser beam from a laser beam source is reflected by a polygon mirror and exposing light 12K is emitted via an optical system using an fθ lens, a deflection mirror, and so on.

When an image is formed, the circumferential surface of the photoconductor drum 7K is uniformly charged by the charger 8K in the dark, and then is exposed by the exposing light 12K (a laser beam in this example) from the exposing unit 9K corresponding to a black image, so that an electrostatic latent image is formed on the photoconductor drum 7K. This electrostatic latent image is changed to a visible image by black toner in the developing unit 10K, and a black toner image is formed on the photoconductor drum 7K.

This toner image is transferred onto the paper 2 by a transferring unit 13K at a so-called transferring position where the photoconductor drum 7K contacts the paper 2 on the carrying belt 3, and a single color (black) image is formed on the paper 2. Unnecessary toner remaining on the circumferential surface of the photoconductor drum 7K is removed by the photoconductor cleaner 11K, and the photoconductor drum 7K finishes the transfer and is prepared to form the next image.

The paper 2 on which the single color (black) is transferred by the electronic processing unit 1K is carried to the next electronic processing unit 1M by the carrying belt 3. In the electronic processing unit 1M, by the same process as that in the electronic processing unit 1K, a magenta toner image formed on the photoconductor drum 7M is transferred onto the paper 2 by registering the toner magenta image on the black toner image.

Further, the paper 2 is carried to the next electronic processing unit 1Y and by the same process a yellow toner image formed on the photoconductor drum 7Y is transferred onto the paper 2 by registering the yellow toner image onto the black and magenta toner images. By the same process, a cyan toner image is transferred onto the paper 2 by registering the cyan toner image onto the black, magenta, and yellow toner images in the next electronic processing unit 1C, and a full color image can be obtained.

The paper 2, on which the full color image is formed, is removed from the carrying belt 3 after passing through the electronic processing unit 1C, and is fixed in a fixing unit 14 and is output.

The above color image forming apparatus uses a so-called direct transfer system that directly transfers a toner image from a photoconductor body onto a paper. However, instead of directly transferring the single color images onto the paper, there is also an intermediate transfer system that transfers a full color image onto a paper after temporarily forming the full color image on an intermediate transfer unit from photoconductor bodies. In the intermediate transfer system, since the medium on which the color image is formed does not change its thickness and moisture absorbing property (paper changes those properties), a stable image can be obtained.

In the above color image forming apparatus, there are center distance difference among photoconductor drums, parallelization degree difference among the photoconductor drums, disposition difference among deflection mirrors, writing timing difference of exposing light to the photoconductor drums, and change of linear velocity of the photoconductor drums. Consequently, there is a problem in that images are not registered at the position where the images should be registered and displacement among colors occurs. The main reasons for this displacement are skew caused by unevenness of slant of scanning lines among colors, sub scanning registration displacement in which each image position is displaced in the sub scanning direction (carrying direction of the paper 2 by the carrying belt 3) perpendicular to the main scanning direction, sub scanning pitch irregularity, main scanning registration displacement where the writing start position and the writing end position in the main scanning direction are displaced, and magnifying power difference in which the lengths of the scanning lines among colors are different.

In the image forming apparatus shown in FIG. 1, positioning difference due to a speed change of a belt carrying unit, caused by a change of the belt thickness, eccentricity of carrying rollers, and speed irregularity of a driving motor, produces a waveform having plural frequency components as shown in FIG. 2(*a*). In an output image in which images are registered during the speed change of the belt carrying unit, positions of colors do not match as shown in FIG. 2(*b*); therefore, image quality of the output image is deteriorated, that is, displacement of colors and a color change occur.

As mentioned in the conventional technology, when marks are formed on the belt, the marks are read by an optical sensor, and the driving motor is controlled by calculating the moving speed from a time interval of read signals, and the speed irregularity and the positioning difference of the carrying belt can be reduced. As shown in FIG. 2(*c*), if at least low frequency components of the speed change are controlled, the displacement of colors can be reduced.

As a mark to be formed on the carrying belt, a single mark or plural marks are acceptable. However, in a case where the moving speed of the carrying belt (moving body) is detected, as shown in FIG. 3(*a*), when marks 26 each having a slit type pattern are formed on a carrying belt 25, which is rotated by a driving roller 22 and driven rollers 23 and 24 driven by a motor 20, with the same interval pitch, a signal whose output frequency is changed corresponding to the speed change of the carrying belt 25 can be detected by an optical sensor 27. In FIG. 3(*b*), the marks 26 formed in the carrying belt 25 are shown in detail, and the surfaces of the marks 26 are covered with a protecting layer 28. In this, the reference number 21 is a transmission device disposed between the motor 20 and the driving roller 22.

However, in the explanation of the conventional technology, a suitable method of forming the marks on the carrying belt is not described and problems to be solved at the time of actual usage are also not described.

For the above problems, the present inventor discloses a technology in Japanese Laid-Open Patent Application No. 2004-99248 and Japanese Priority Patent Application No. 2003-52972. In the technology, the following advantages are described by forming a surface protecting layer for marks in an endless belt carrying unit.

(1) Marks are prevented from being damaged due to contact with rollers and a cleaning blade.

(2) Lower strength caused by forming the marks is compensated for.

(3) Even when a mark made of a metal reflection film is used, a leakage current of a high voltage such as a transfer bias is prevented from being generated.

(4) When a mark protecting layer is formed, occurrence of a pitch difference between marks is prevented.

In addition, the present inventor discloses a technology in Japanese Laid-Open Patent Application No. 2004-202498.

This technology controls the speed of an intermediate transfer belt to be constant by directly detecting the surface speed of the intermediate transfer belt with the use of feedback. A reflection slit pattern is formed by applying a low heat damage process with the use of a short pulse laser beam to an aluminum deposition tape having a PET protecting layer stuck on the surface of the intermediate transfer belt. A laser process can be applied on the protecting layer so that damage to the belt is low, and a reflection type sensor can be used. That is, this technology includes materials used in this structure, laser wavelengths, and its processing method.

The following problems are shown when reflectance control of a metal material layer is executed by a laser beam process.

(1) An adhesive under the metal material layer is damaged by heat at the time of laser beam processing.

(2) It is difficult to form a pattern with high accuracy due to occurrence of enlarging the pattern part caused by thermal conduction of metal at the time of laser beam processing.

(3) Even when a protecting layer exists, there is a possibility that current leakage occurs from ends and a crack of the protecting layer.

[Patent Document 1] Japanese Laid-Open Patent Application No. 6-263281

[Patent Document 2] Japanese Laid-Open Patent Application No. 9-114348

SUMMARY OF THE INVENTION

It is a general object of the present invention to provide a mark forming method for a moving body and a moving body having a mark, in which a moving state of the moving body such as a carrying belt in an image forming apparatus can be obtained accurately and moving speed unevenness of the moving body can be reduced without having damage or occurrence of a crack in the moving body and without generating a leakage current even when the moving body is exposed in a strong electric field.

Features and advantages of the present invention are set forth in the description that follows, and in part will become apparent from the description and the accompanying drawings, or may be learned by practice of the invention according to the teachings provided in the description. Objects as well as other features and advantages of the present invention will be realized and attained by a mark forming method for a moving body and a moving body having a mark particularly pointed out in the specification in such full, clear, concise, and exact terms as to enable a person having ordinary skill in the art to practice the invention.

To achieve these and other advantages in accordance with the purpose of the present invention, according to a first aspect of the present invention, there is provided a mark forming method for a moving body. The mark forming method for the moving body includes the steps of forming a second material layer, which scatters second wavelength light by being dispersed a first material that has a light absorbing property for first wavelength light therein, on a moving body; irradiating the first wavelength light on a part of the second material layer, making the first material at the part absorb the first wavelength light, and changing a scattering property of the part of the second material layer; and forming a mark whose scattering property for the second wavelength light is different in the part.

According to a second aspect of the present invention, the mark forming method for the moving body further includes the steps of forming a third material layer which has high transparency for the first and second wavelength light on a surface of the second material layer; irradiating the first wavelength light on a part of the third material layer, and changing the scattering property of the part of the second material layer by the first wavelength light transmitted through the third material layer.

According to a third aspect of the present invention, the mark forming method for the moving body further includes the steps of forming a fourth material layer whose reflectance for the second wavelength light is high between the second material layer and the moving body; changing the scattering property of the part of the second material layer by the first wavelength light; and forming a mark whose scattering property for the second wavelength light is different in the part.

According to a fourth aspect of the present invention, the second material layer is made of an adhesive in which the first material is dispersed.

According to a fifth aspect of the present invention, the second material layer is made of a transparent resin in which the first material is dispersed.

According to a sixth aspect of the present invention, the first wavelength light has a wavelength of 400 nm or less, and the first material is a titanium oxide.

According to a seventh aspect of the present invention, the first material is a metal particle, and the second material layer is made of a transparent material for the first wavelength light.

According to an eighth aspect of the present invention, a pulse width of the first wavelength light is 200 ns or less.

According to a ninth aspect of the present invention, there is provided a moving body having a mark that has at least one mark formed by the mark forming method in the first aspect.

According to a tenth aspect of the present invention, there is provided an endless belt that has at least one mark formed by the mark forming method in the first aspect.

According to an eleventh aspect of the present invention, there is provided a paper carrying belt of an image forming apparatus that has at least one mark formed by the mark forming method in the first aspect.

According to a twelfth aspect of the present invention, there is provided an intermediate transfer belt of an image forming apparatus that has at least one mark formed by the mark forming method in the first aspect.

EFFECT OF THE INVENTION

According to a first embodiment of the present invention, a second material layer (substrate material layer), in which a first material having a light absorbing property (light absorbing dispersion material) is dispersed, is formed on a moving body, and by irradiating a light beam on a part of the second material layer, the part is transformed and a mark is formed at the part. Therefore, the tensile strength of the moving body is not decreased and its stretching is small, and the carrying state of the moving body can be obtained with high accuracy. Further, the position and the moving speed of the moving body can be detected with high accuracy by using the mark.

According to a second embodiment of the present invention, since a third material layer (transparent film) is disposed on the second material layer (substrate material layer), various functions such as prevention of a scratch and prevention of adhesion of toner and dust on the mark forming positions, and restraint of deterioration with the passage of time of the second material layer can be added.

According to a third embodiment of the present invention, since a fourth material layer (reflection film) is disposed on a lower surface of the second material layer (substrate material layer), scattering strength in the second material layer can be greater. With this, the mark can be detected by low output light, its SNR of signals is increased, and stable signal detection can be executed.

According to a fourth embodiment of the present invention, since the second material layer (substrate material layer) is made of an adhesive (including an adhesive whose agglutinating property is low) in which the first material (light absorbing dispersion material) is dispersed, for example, by directly painting a white pressure sensitive adhesive on the moving body, the second material layer can be easily formed on the moving body, the number of processes for forming the marks can be reduced, and the mark forming cost can be reduced.

According to a fifth embodiment of the present invention, the second material layer (substrate material layer) is made of a transparent resin (transparent high polymer material) in which the first material (light absorbing dispersion material) is dispersed, many transparent resins can be obtained at a low cost, and the first material can be easily dispersed in the transparent resins. When a fluorine-containing film is used as the transparent resin, the second material layer can be prevented from being contaminated. In addition, a heat resisting material such as a polyimide resin can be used as the transparent resin.

Further, a thin film of the transparent resin (transparent high polymer material) can be easily formed by painting and dipping in a vessel; therefore, the thin film can be formed at a relatively low temperature. In addition, since thermal conduction of the transparent resin is low, thermal diffusion caused by the irradiation of the first wavelength light (laser beams for processing) can be restrained; consequently, leaking out of the first wavelength light from the irradiating areas can be prevented; with this, the marks can be accurately formed.

Since the transparent resin can be easily transformed by heat, an electron collision, a radical reaction, and so on, even when the energy of the first wavelength light is low, the scattering property can be changed.

According to a sixth embodiment of the present invention, when ultraviolet light whose wavelength is 400 nm or less is irradiated on the first material (light absorbing dispersion material) made of titanium oxide particles, the titanium oxide particles are transformed by breaking their chemical bond due to emission of electrons. Therefore, the change of scattering strength which is difficult to achieve by only heating can be easily obtained in the second material layer (substrate material layer).

In addition, the titanium oxide particles can be obtained as a white dispersion material, and have a property of being scattered by light of a wide wavelength region. Therefore, the titanium oxide particles can be detected by an optical sensor whose wavelength region is wide.

According to a seventh embodiment of the present invention, metal particles are used as the first material (light absorbing dispersion material). Since many metal particles absorb light of wide ranges from near infrared rays to ultraviolet rays, the metal particles can be used. In addition, the scattering strength can be changed by using laser beams of wide wavelength as the first wavelength light, and when the metal particles are used as the first material, the scattering property becomes high and detecting signals by an optical sensor becomes easy.

According to an eighth embodiment of the present invention, since a short pulse laser beam whose pulse width is 200 ns or less is used as the first wavelength light (light beams for processing), heat damage at the time of processing can be reduced, and edge shapes of a part to be processed can be formed with high accuracy. In addition, since input laser peak fluence is high at the time of multiple photon absorption, the laser beams whose pulse width is short are effective. Therefore, even in a material whose absorption is low for laser beams whose width is not short, its material transformation can be executed by the multiple photon absorption.

Further, even when a metal material whose heat conduction is high is used, since the transforming region can be formed in some submicrons by a laser beam of a femtosecond region, the skew around a part to be processed can be further restrained.

According to a ninth embodiment of the present invention, since at least one mark formed by the mark forming method described above is disposed in a moving body, the detection of the surface position and the moving speed of the moving body, which is conventionally difficult, can be easily executed, and driving the moving body and detecting the position thereof with high accuracy can be executed.

According to a tenth embodiment of the present invention, since at least one mark formed by the mark forming method described above is disposed on an endless belt, the detection of the surface position and the moving speed of the endless belt, which is conventionally difficult, can be easily executed, and driving the endless belt and detecting the position thereof with high accuracy can be executed.

According to an eleventh embodiment of the present invention, since at least one mark formed by the mark forming method described above is disposed in a paper carrying belt of an image forming apparatus, the detection of the surface position and the moving speed of the paper carrying belt, which is conventionally difficult, can be easily executed, and driving the paper carrying belt and detecting the position thereof with high accuracy can be executed.

In the paper carrying belt having the mark, by controlling the position thereof by using signals detected by the mark, the unevenness of its paper feeding in the image forming apparatus can be reduced and adjusting the position thereof can be executed with high accuracy.

According to a twelfth embodiment of the present invention, since at least one mark formed by the mark forming method described above is disposed in an intermediate transfer belt of an image forming apparatus, the detection of the surface position and the moving speed of the intermediate transfer belt, which is conventionally difficult, can be easily executed, and driving the intermediate transfer belt and detecting the position thereof with high accuracy can be executed.

In the intermediate transfer belt having the mark, by controlling the position thereof using signals detected by the mark, the unevenness of the movement of the intermediate transfer belt in the image forming apparatus can be reduced and position control such as correction of changes caused by outside reasons can be executed with high accuracy.

BRIEF DESCRIPTION OF THE DRAWINGS

Other objects, features and advantages of the present invention will become more apparent from the following detailed description when read in conjunction with the accompanying drawings, in which:

FIG. 3 is a diagram explaining a conventional detecting method of a belt moving speed;

DESCRIPTION OF THE PREFERRED EMBODIMENTS

In the following, embodiments of the present invention are described with reference to the accompanying drawings.

Best Mode of Carrying Out the Invention

[Basic Principle]

In order to solve the above problems, according to embodiments of the present invention, first, a substrate material layer (second material layer), which scatters light for detecting (second wavelength light), is formed on a moving body by a substrate material (second material) in which a dispersion material (first material) having a light absorbing property is dispersed, and light for processing (first wavelength light) is irradiated on a position of a mark of the substrate material layer. Thus the substrate material layer at the position of the mark is transformed by making the dispersion material inside the substrate material layer absorb the light for processing, and the mark whose scattering property for the light for detecting is different is formed. This is the basis of forming the mark.

Figure 1:
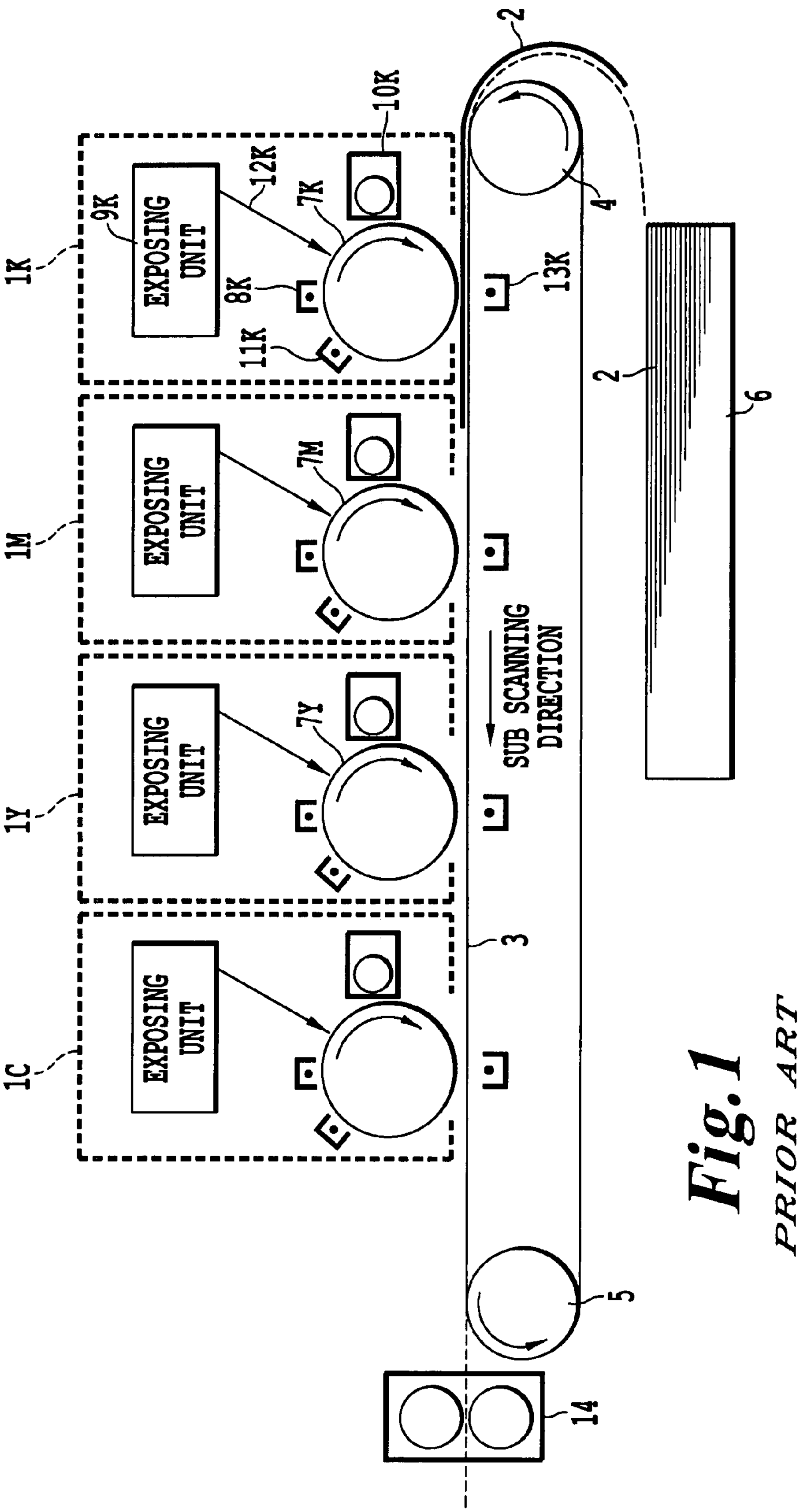
Fig. 1 PRIOR ART
FIG. 1 is a schematic diagram of a conventional color image forming apparatus to which the present invention is suitably applied.
Figure 2A:
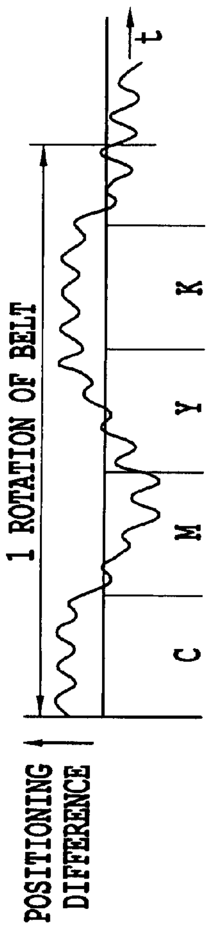
Fig. 2(a) PRIOR ART
FIG. 2 is a diagram explaining a belt position change of a belt carrying unit using in the conventional color image forming apparatus.
Figure 2B:
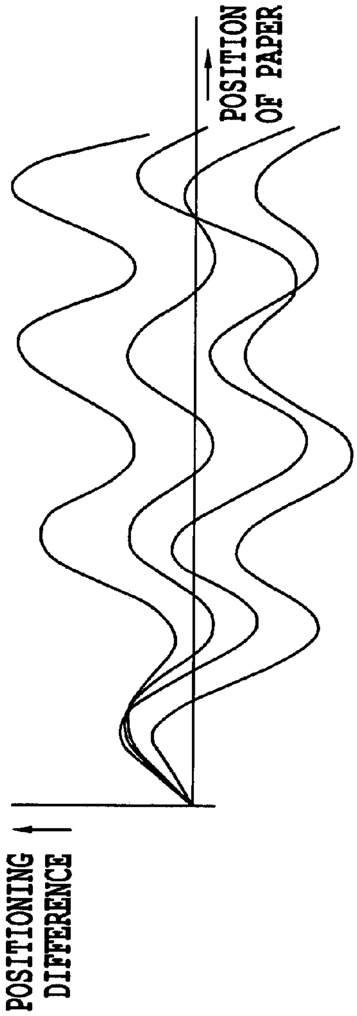
Fig. 2(b) PRIOR ART
Figure 2C:
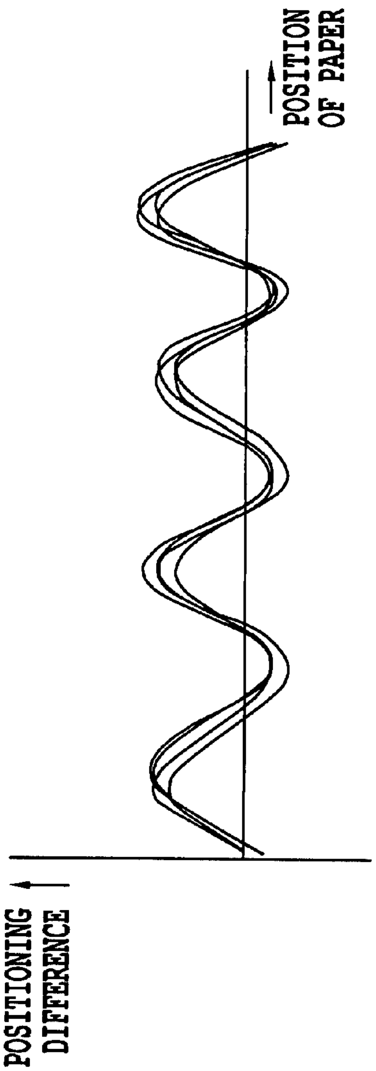
Fig. 2(c) PRIOR ART
Figure 4A:
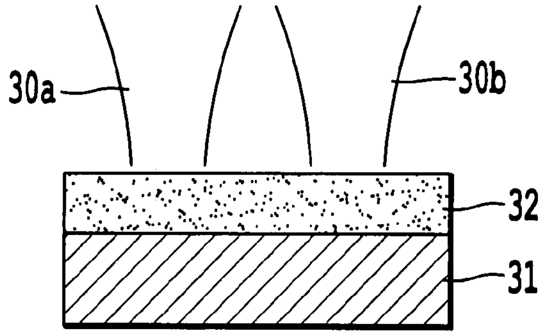
FIG. 4 is a schematic diagram explaining a basic principle of a mark forming method according to a first embodiment of the present invention.
Figure 4B:
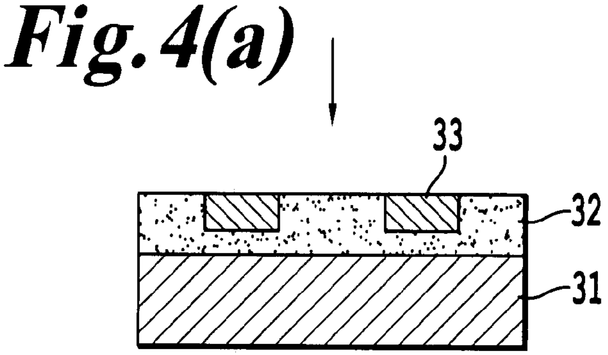
Figure 4C:
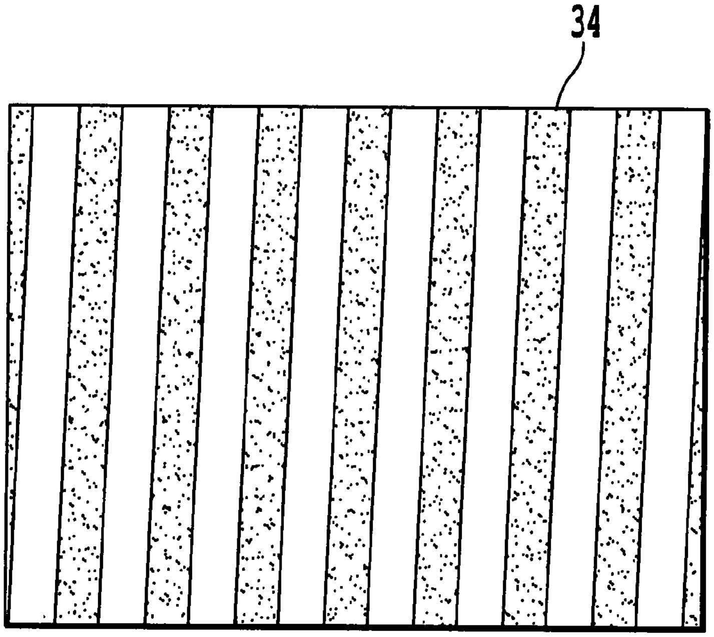

Referring to FIG. 4, a basic principle of forming the mark for controlling the position of the moving body is explained.

When laser beams for processing 30*a* and 30*b* are irradiated on a substrate material layer 32 having a property of being able to be transformed on a moving body 31, energy of the light beams 30*a* and 30*b* is selectively absorbed by a dispersion material having a light absorbing property dispersed in the substrate material layer 32. This absorbed energy is transferred to the substrate material of the substrate material layer 32, and the dispersion material and the substrate material at the laser beams irradiated positions are optically transformed. In FIG. 4(*b*), black parts 33 are transformed parts. By adjusting the number of irradiating laser beam pluses and their energy strength, as shown in FIG. 4(*c*), only laser irradiated parts 34 can be selectively transformed (black parts in FIG. 4(*c*) are the laser irradiated parts 34).

In the example shown in FIG. 4(*c*), third higher harmonic waves (laser beams for processing) of an Nd:YAG laser are irradiated on a PET substrate material in which titanium oxide particles (dispersion material) are dispersed. At this time, energy absorbed in the titanium oxide particles can be considered to transform a polymer resin surrounding the irradiated parts by a heating or an electron emission. In this case, by adjusting a laser beam irradiating shape, a part to be transformed can be formed in an arbitrary shape. In addition, since the transformation occurs inside a solid material, when a transparent material is disposed on the substrate material layer, the same transformation can be executed.

Further, this transformation can be executed in the titanium oxide particles dispersed in an acrylic resin adhesive; therefore, the marks can be formed in various materials.

As mentioned above, irradiating laser beams are absorbed by a dispersion material having a light absorbing property dispersed in a substrate material, and parts of the substrate material where the light beams are irradiated are transformed; with this, a mark pattern can be formed with high accuracy.

Further, according to the embodiments of the present invention, in a carrying belt of an image forming apparatus and so on, a belt carrying state can be accurately obtained and moving speed unevenness of the carrying belt can be reduced without having damage or occurrence of a crack in the carrying belt and without generating a leakage current even when the carrying belt is exposed in a strong electric field. In order to achieve the above, forming a mark on the carrying belt is realized by transforming a substrate material layer of the carrying belt in which a light absorbing material is dispersed by irradiating a laser beam.

First Embodiment

Figure 5:
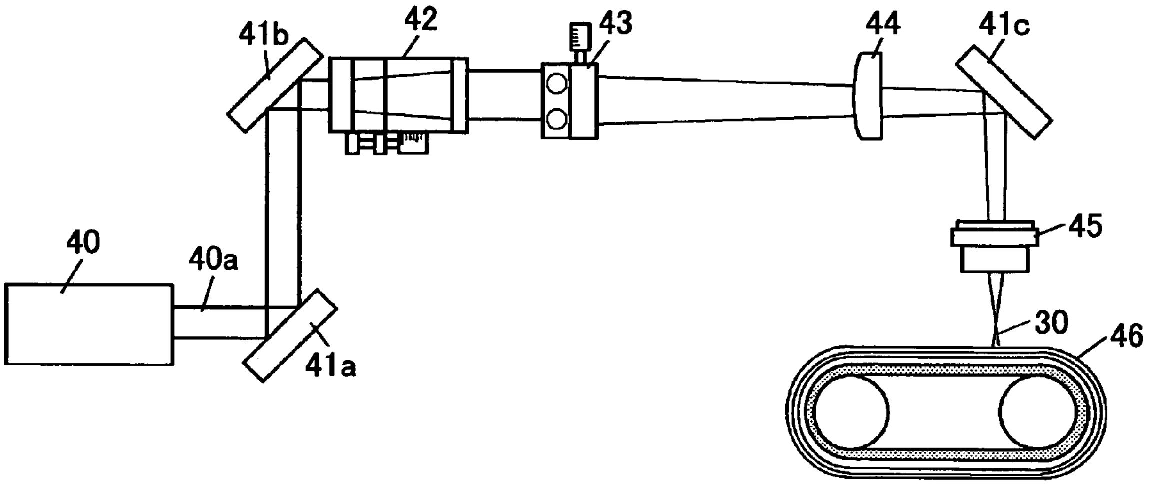
FIG. 5 is a schematic diagram of a laser beam processing device for forming a mark of the present invention.

Again referring to FIG. 4, and further, referring to FIG. 5, a first embodiment of the present invention is explained. As mentioned above, FIG. 4 is a schematic diagram explaining the basic principle of forming a mark. FIG. 5 is a schematic diagram of a laser beam processing device.

First, the basic principle is explained in more detail. A dispersion material, whose laser beam for processing (30*a* and 30*b*) absorbing property is high, for example, titanium oxide particles, is dispersed on a PET resin being a substrate material, and with this, a substrate material layer 32 is formed. The substrate material layer 32 is disposed on a surface of a moving body 31 which is made of, for example, a resin such as a PI (polyimide) resin, a PET (polyethylene terephthalate) resin, and a PVDF (polyvinylidene fluoride) resin, or a metal material such as stainless steel. At this time, the substrate material layer 32 disposed on the surface of the moving body 31 is made of a material which shows a relatively high scattering property for a light wavelength for detecting a mark by dispersing the above dispersion material. This substrate material layer 32 can be easily formed by spray painting or dipping in a vessel.

In order to form marks 33 in the substrate material layer 32 on the moving body 31, laser beams for processing 30*a* and 30*b* whose sizes are formed in desirable shapes with adjusted energy are irradiated on the substrate material layer 32 (refer to FIG. 4(*a*)). The laser beams for processing 30*a* and 30*b* are absorbed by the titanium oxide particles existing at irradiated positions, and the irradiated positions of the substrate material layer 32 are transformed by the energy. Consequently, at the positions irradiated by the laser beams for processing 30*a* and 30*b*, the marks 33 whose scattering property is different from their original scattering property are formed (refer to FIG. 4(*b*)). Therefore, the marks 33 can be detected by an optical sensor which uses light for detecting. At this time, the amount of scattering can be adjusted by adjusting the degree of dispersion of the titanium oxide particles. In addition, an arbitrary pattern in a large size area can be formed in the substrate material layer 32 by changing the shapes and the irradiating positions of the laser beams for processing 30*a* and 30*b*.

In addition, when a material such as a high polymer resin and ceramics whose thermal diffusivity is low is used as the substrate material, the marks 33 can be formed with high accuracy by restraining the irradiation area being enlarged by heat at the time of irradiating laser beams onto, for example, a metal.

Next, referring to FIG. 5, a laser beam processing device that irradiates a laser beam 30 to the substrate material layer 32 is explained.

The laser beam processing device includes a laser beam source 40, mirrors 41*a*, 41*b*, and 41*c*, a magnifying optical element 42, a shaping optical element 43, a cylindrical lens 44, and a condensing optical element 45. A laser beam 40*a* output from the laser beam source 40 which uses, for example, a third higher harmonic wave of an Nd:YAG laser is shaped in a line shape by the optical elements 41*a* through 45, and is irradiated on a surface of a rotating body 46 being an object to be processed (a substrate material layer on a moving body) as a laser beam for processing 30. Continuous marks can be formed on the surface of the rotating body 46 by controlling the irradiating timing of the laser beam for processing 30 and the position of the rotating body 46 while continuously moving the position of the surface of the rotating body 46.

At this time, as explained in the basic principle forming the marks (FIGS. 4(*a*) and (*b*)), the marks 33 whose optical property is changed can be obtained. When a pattern of the marks 33 is formed on the moving body, a change of signal strength corresponding to the movement of the moving body can be detected by an optical sensor. Therefore, the accurate position and the accurate moving speed of the moving body can be detected.

According to the first embodiment, a first material (light absorbing dispersion material) which has a high absorbing property for the first wavelength light (laser beams for processing 30*a* and 30*b*) is dispersed in a second material (substrate material); then, a second material layer (substrate material layer) in which the first material is dispersed in the second material is formed on a surface of the moving body. At this time, the second material layer formed on the moving body is made of a material that shows a relatively high scattering property for the second wavelength light (light for detecting) due to the dispersion of the first material (dispersion material). This second material layer can be formed by spray painting or dipping in a vessel. When the first wavelength light which is formed in a desirable shape and its energy is adjusted is irradiated on the second material layer, the first wavelength light is absorbed by the first material existing in the irradiated positions where the dispersion material is dispersed, and the second material layer at the irradiated potions is transformed. With this, the irradiated positions have a scattering property different from their initial scattering property. Therefore, the irradiated positions can be detected by an optical sensor using the second wavelength light. At this time, the scattering amount can be controlled by adjusting the degree of dispersion of the first material.

Further, at this time, an arbitrary pattern can be formed by changing the irradiating positions and the shape of the first wavelength light.

As for the second material (substrate material), by using a material whose heat diffusion coefficient is small, such as a high polymer resin and ceramics, enlarging the irradiated positions like at the time of laser beam irradiation to, for example, a metal, is restrained, and the marks can be formed with high accuracy.

Second Embodiment

Figure 6:
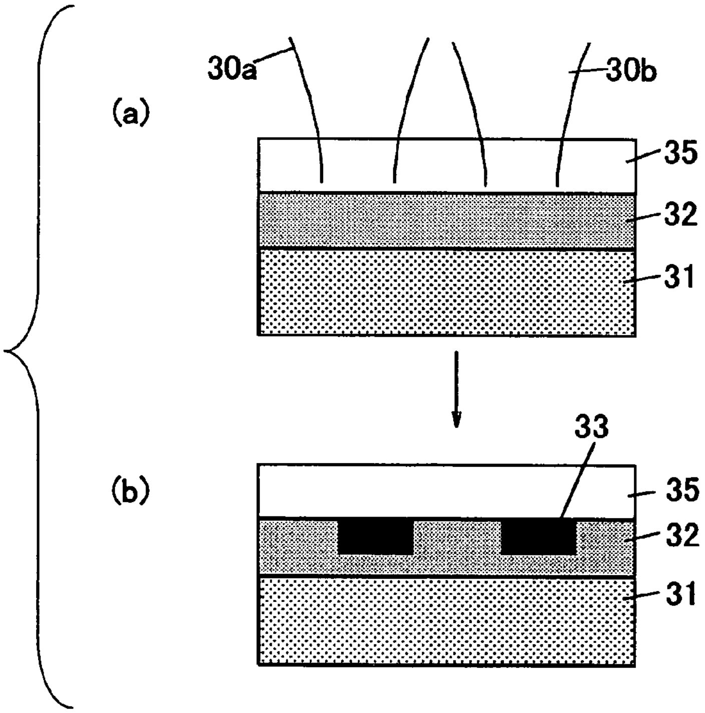
FIG. 6 is a schematic diagram explaining a mark forming method according to a second embodiment of the present invention.

Referring to FIG. 6, a second embodiment of the present invention is explained. FIG. 6 is a schematic diagram explaining a mark forming method according to the second embodiment of the present invention.

In the second embodiment, on the substrate material layer 32 formed by dispersing, as in the first embodiment, such as titanium oxide particles on a PET resin, a transparent film 35 made of a material such as a PET resin being transparent for light wavelengths for processing and detecting is disposed. The substrate material and the dispersion material inside the substrate material layer 32 are transformed by a laser beam, for example, an ultraviolet light laser beam, by the same operation as in the first embodiment. In the second embodiment, forming and detecting the marks 33 are executed by the ultraviolet light laser beam transmitting through the transparent film 35. Therefore, the movement of the moving body 31 can be detected by the scattering amount of light for detecting the marks 33.

At this time, various functions can be added by selecting a material for the transparent film 35. For example, a scratch on a mark position, which may occur by forming only the substrate material layer 32, can be prevented by disposing a thin transparent film. In addition, when the transparent film 35 made of a material whose wetting property is low such as a fluorine-containing resin is disposed, toner and dust can be prevented from adhering. Further, directly contacting the dispersion material with air can be prevented by disposing the transparent film 35; with this, deterioration of the substrate material layer 32 with the passage of time can be restrained.

Forming the marks 33 on the substrate material layer 32 can be executed by using the laser beam processing device shown in FIG. 5 explained in the first embodiment. For example, laser beams 30*a* and 30*b* from an ultraviolet light laser are irradiated on the substrate material layer 32 in which the particles made of, for example, titanium oxide are dispersed via the transparent film 35 made of a PET resin and so on. At this time, by heat and electron emission caused by light absorption in the titanium oxide particles, the PET material including the titanium oxide particles at the irradiated positions is transformed to black (refer to FIG. 6(*b*)). The irradiated position is initially white because of scattering of the titanium oxide particles, but is changed to black by the irradiation of the laser beams 30*a* and 30*b*. Therefore, a laser beam irradiated area and a laser beam non-irradiated area can be easily detected by using an optical sensor. When such a pattern is disposed on the surface of the moving body 31 and the pattern is detected by an optical sensor, the position and the moving speed of the moving body 31 corresponding to the movement thereof can be detected.

According to the second embodiment, a third material layer (transparent film) being transparent for the first and second wavelength light (light beams for processing and detecting) is disposed on the upper surface of the second material layer (substrate material layer), the marks are formed by the first wavelength light (light beams for processing) which transmits through the third material layer, and the second material layer under the third material layer is transformed by the same operation in the first embodiment. Due to this, the scattering amount for the second wavelength light (light beams for detecting) is changed, and the movement of the moving body can be detected.

At this time, by disposing the third material layer (transparent film) on the second material layer (substrate material layer), various functions such as prevention of a scratch, prevention of adhesion of toner and dust on the mark forming positions, and restraint of deterioration with the passage of time of the second material layer can be added.

Third Embodiment

Figure 7A:
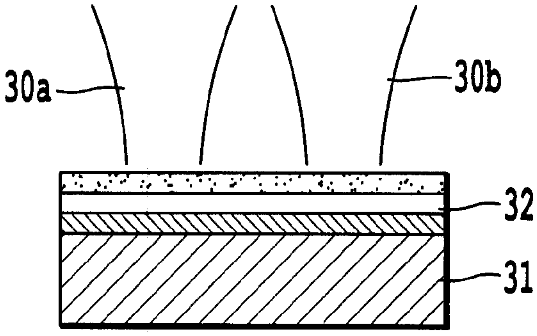
FIG. 7 is a schematic diagram explaining a mark forming method according to a third embodiment of the present invention.
Figure 7B:
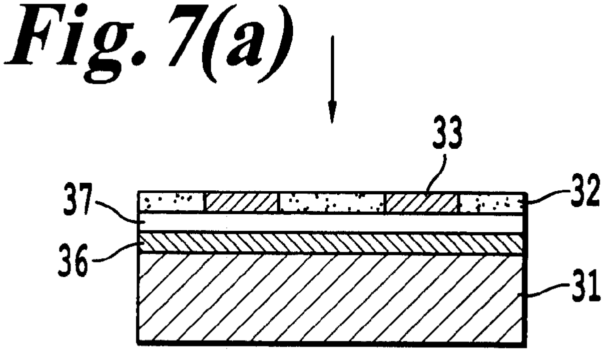

Referring to FIG. 7, a third embodiment of the present embodiment is explained. FIG. 7 is a schematic diagram explaining a mark forming method according to the third embodiment of the present invention.

In the third embodiment, a reflection film 37 for a mark detecting sensor is disposed on the lower surface of the substrate material layer 32. At this time, the thinner the substrate material layer 32 is, the greater the effect is. The scattering strength in the substrate material layer 32 is made greater by the reflection film 37.

Like in the first and second embodiments, positions where the laser beams 30*a* and 30*b* are irradiated are transformed in the substrate material layer 32. When the transformed positions of the substrate material layer 32 are detected by an optical sensor, the scattering strength can be increased by disposing the reflection film 37. For example, the marks 33 can be detected by low output light, and with this, the SNR (signal to noise ratio) of signals is increased and a stable signal detection can be executed.

The third embodiment is explained in more detail. A thin polymer resin in which dispersion particles are dispersed (substrate material layer 32) is painted on a metal reflection film (reflection film 37) having an adhesive 36, and this formed material is stuck on the surface of the moving body 31. Next, positions where the laser beams 30*a* and 30*b* are irradiated are transformed in the substrate material layer 32, and with this, the marks 33 are formed at the laser irradiated positions by the same operations as in the first and second embodiments. Signal strength between the laser irradiated area and the laser non-irradiated area is changed greatly by disposing the reflection film 37 on the lower surface of the substrate material layer 32; therefore, the detection of the marks 33 by an optical sensor can be executed easily and accurately.

According to the third embodiment, a fourth material layer (reflection film) for the detecting sensor (optical sensor for detecting) is formed on the lower surface of the second material layer (substrate material layer). At this time, the thinner the second material layer is, the greater the effect is, and the scattering strength in the second material layer can be greater due to the existence of the fourth material layer.

Like in the first embodiment, the second material layer is transformed by irradiating the first wavelength light (light beams for processing) on the second material layer. When the transformed second material layer is detected by an optical sensor, the scattering strength can be greater due to the disposition of the fourth material layer. For example, the marks can be detected by low output light, the SNR of signals is increased, and stable signal detection can be executed.

Fourth Embodiment

Figure 8:
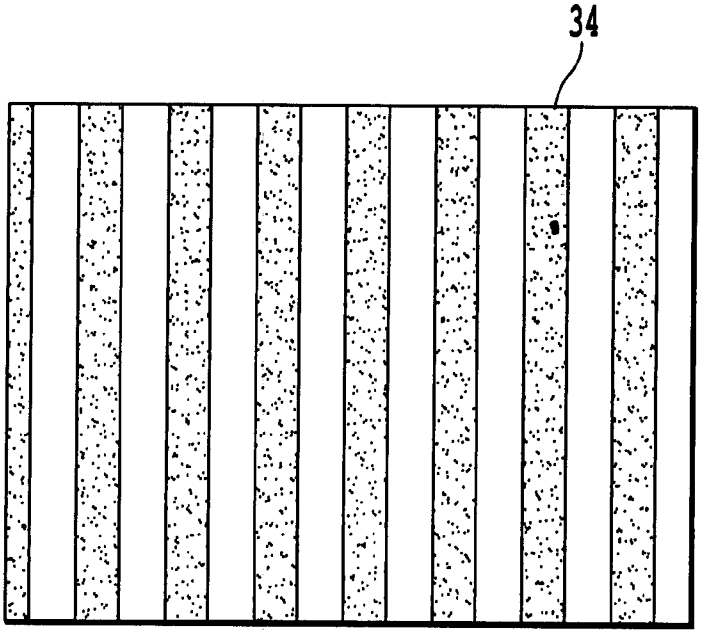
FIG. 8 is a diagram showing a mark formed result according to a fourth embodiment of the present invention.

Referring to FIG. 8, a fourth embodiment of the present invention is explained. FIG. 8 is a diagram showing a result in which a substrate material layer is made of an adhesive and marks are formed in the substrate material layer. In the fourth embodiment, the substrate material layer is formed by dispersing a light absorbing material such as titanium oxide particles in a transparent adhesive (including an adhesive whose agglutinating property is low). As the adhesive, an acrylic resin, a silicon resin, and so on can be used. An adhesive containing a dispersion material can be easily obtained by dispersing titanium oxide particles in an adhesive.

As mentioned above, forming a substrate material layer on a moving body becomes easy by using an adhesive as a substrate material. For example, by directly painting a white pressure sensitive adhesive on a moving body, a substrate material layer can be easily formed on the moving body. Generally, it is considered that such a soft and deformable adhesive is difficult to be processed. However, as shown in FIG. 8, laser beam irradiated areas 34 in the substrate material layer are transformed by irradiating a laser beam onto a light absorbing material dispersed in the adhesive, and the scattering strength is changed between the laser beam irradiated areas 34 and laser beam non-irradiated areas. The result was found as shown in FIG. 8 (photograph).

By the above, the number of processes for forming the marks can be reduced and the mark forming cost can be reduced.

Fifth Embodiment

In a fifth embodiment, the second material layer (substrate material layer) is formed by dispersing the first material (light absorbing dispersion material) in a transparent resin (transparent high polymer material). Many transparent resins can be obtained at a low cost, and the first material can be easily dispersed in the transparent resins. When as the transparent resin, a low-adhesive material such as a fluorine-containing resin is selected, it is possible to prevent the second material layer from being contaminated. In addition, as the transparent resin, a heat resisting material such as a polyimide resin can be used.

Further, a thin film of the transparent resin (transparent high polymer material) can be easily formed by painting and dipping in a vessel, and the thin film can be formed at a relatively low temperature. In addition, since thermal conduction of the transparent resin is low, thermal diffusion caused by the irradiation of the first wavelength light (laser beams for processing) can be restrained, leaking out of the first wavelength light from the irradiating areas can be prevented, and with this, the marks can be accurately formed.

Since the transparent resin can be easily transformed by heat, an electron collision, a radical reaction, and so on, even when the energy of the first wavelength light is low, the scattering property can be changed.

Sixth Embodiment

In a sixth embodiment, as the first material (light absorbing dispersion material), titanium oxide particles are used, and the first wavelength light (laser beams for processing) has a wavelength of 400 nm or less. In order to form an accurate mark, titanium oxide particles whose size is a micron or less are preferable. The titanium oxide particles, which are known as a material that has an absorbing property in an ultraviolet light region, are used widely as a white dispersion material, and can be obtained at a very low cost.

When ultraviolet light whose wavelength is 400 nm or less is irradiated on a dispersion material made of titanium oxide particles, the titanium oxide particles are transformed by breaking their chemical bond due to emission of electrons. Therefore, the change of scattering strength which is difficult by only a heating can be easily obtained.

In addition, the titanium oxide particles can be obtained as a white dispersion material, and have a property which shows scattering by light of a wide wavelength region. Therefore, the scattering can be detected by an optical sensor whose wavelength region is wide.

Seventh Embodiment

In a seventh embodiment, metal particles are used for the first material (light absorbing dispersion material), and the second material layer (substrate material layer) is made of a material which is transparent for the first wavelength light (light beams for processing). In order to form an accurate mark, it is preferable that the metal particles whose size is a micron or less be dispersed. Since many metal particles absorb light of wide ranges from near infrared rays to ultraviolet rays, metal particles made of metal such as Au, Ag, Ti, and Al can be used.

In addition, by utilizing the metal particles, it is also possible that the scattering strength will be changed by using laser beams of wide wavelength as the first wavelength light. Since the scattering property becomes high, detecting signals by an optical sensor becomes easy.

Eighth Embodiment

In an eighth embodiment, a short pulse laser beam whose pulse width is 200 ns (nanosecond) or less is used as the first wavelength light (light beams for processing); with this, the second material layer (substrate material layer) is efficiently transformed with low heat damage.

As the short pulse laser beam whose pulse width is 200 ns or less, an excimer-laser beam, a Q-Switch Nd:YAG laser beam and its higher harmonic wave laser beam, a Ti:sapphire laser beam whose pulse width is several 100 fs (femtoseconds), and so on can be used.

When laser beams whose pulse width is short are used, since heat damage at the time of processing can be reduced, edge shapes of a part to be processed can be formed with high accuracy. In addition, since input laser peak fluence is high, the laser beam whose pulse width is short is effective at the time of multiple photon absorption. Therefore, even in a material whose absorption is low for laser beams whose widths are not short, its material transformation can be executed by the multiple photon absorption.

Further, even when a metal material whose heat conduction is high is used, since the transforming region can be formed in some submicrons by a laser beam of the femtosecond region, the skew around a part to be processed can be further restrained.

Ninth Embodiment

In a ninth embodiment, a moving body having a mark is formed. The moving body provides at least one mark formed by the mark forming method described above. Therefore, the detection of the surface position and the moving speed of the moving body, which is conventionally difficult, can be easily executed, and driving the moving body and detecting the position thereof with high accuracy can be executed.

At this time, when, for example, a thin polymer material is used for the second material layer (substrate material layer), the position and the moving speed matching the surface following the movement of the moving body can be detected.

Tenth Embodiment

In a tenth embodiment, an endless belt having a mark is formed. The endless belt provides at least one mark formed by the mark forming method described above. Therefore, the detection of the surface position and the moving speed of the endless belt, which is conventionally difficult, can be easily executed, and driving the endless belt and detecting the position thereof with high accuracy can be executed.

At this time, when, for example, a thin polymer material is used for the second material layer (substrate material layer), the position and the moving speed matching the surface following the rotation of the endless belt can be detected.

Eleventh Embodiment

In an eleventh embodiment, a paper carrying belt having a mark of an image forming apparatus is formed. The paper carrying belt provides at least one mark formed by the mark forming method described above. Therefore, the detection of the surface position and the moving speed of the paper carrying belt, which is conventionally difficult, can be easily executed, and driving the paper carrying belt and detecting the position thereof with high accuracy can be executed.

At this time, when, for example, a thin polymer material is used for the second material layer (substrate material layer), the position and the moving speed matching the surface following the movement of the paper carrying belt can be detected.

In the paper carrying belt having the mark, by controlling the position thereof by using signals detected by the mark, the unevenness of the paper feeding in the image forming apparatus can be reduced and adjusting the position thereof can be executed with high accuracy.

Twelfth Embodiment

In a twelfth embodiment, an intermediate transfer belt having a mark of an image forming apparatus is formed. The intermediate transfer belt provides at least one mark formed by the mark forming method described above. Therefore, the detection of the surface position and the moving speed of the intermediate transfer belt, which is conventionally difficult, can be easily executed, and driving the intermediate transfer belt and detecting the position thereof with high accuracy can be executed.

At this time, when, for example, a thin polymer material is used for the second material layer (substrate material layer), the position and the moving speed matching the surface following the movement of the intermediate transfer belt can be detected. In addition, when the non-conductive material is used as the second material layer, a current leakage being a problem in the intermediate transfer belt does not exist, and this does not cause a bad effect on other elements in the apparatus.

In the intermediate transfer belt having the mark, by controlling the position thereof using signals detected by the mark, the unevenness of the movement of the intermediate transfer belt in the image forming apparatus can be reduced and the position control such as correction of changes caused by outside reasons can be executed with high accuracy.

Further, the present invention is not limited to the specifically disclosed embodiments, and variations and modifications may be made without departing from the scope of the present invention.

The present invention is based on Japanese Priority Patent Application No. 2004-328025, filed on Nov. 11, 2004, with the Japanese Patent Office, the entire contents of which are hereby incorporated by reference.

What is claimed is:

1. A mark forming method for a moving body, comprising the steps of:

forming a second material layer, which scatters second wavelength light, in which a first material having a light absorbing property for a first wavelength light is dispersed, on a moving body;

irradiating the first wavelength light on a part of the second material layer, making the first material at the part absorb the first wavelength light, and changing a scattering property of the part of the second material layer; and forming a mark whose scattering property for the second wavelength light is different in the part.

2. The mark forming method for the moving body as claimed in claim 1, further comprising the steps of:

forming a third material layer which has high transparency for the first and second wavelength light on a surface of the second material layer; and irradiating the first wavelength light on a part of the third material layer, and changing the scattering property of the part of the second material layer by the first wavelength light transmitted through the third material layer.

3. The mark forming method for the moving body as claimed in claim 2, further comprising the steps of:

forming a fourth material layer whose reflectance for the second wavelength light is high between the second material layer and the moving body;

changing the scattering property of the part of the second material layer by the first wavelength light; and forming a mark whose scattering property for the second wavelength light is different in the part.

4. The mark forming method for the moving body as claimed in claim 1, wherein:

the second material layer is made of an adhesive in which the first material is dispersed.

5. The mark forming method for the moving body as claimed in claim 1, wherein:

the second material layer is made of a transparent resin in which the first material is dispersed.

6. The mark forming method for the moving body as claimed in claim 1, wherein:

the first wavelength light has a wavelength of 400 nm or less, and the first material is a titanium oxide.

7. The mark forming method for the moving body as claimed in claim 1, wherein:

the first material is a metal particle, and the second material layer is made of a transparent material for the first wavelength light.

8. The mark forming method for the moving body as claimed in claim 1, wherein:

a pulse width of the first wavelength light is 200 ns or less.

9. A moving body having a mark that has at least one mark formed by the mark forming method as claimed in claim 1.

10. An endless belt that has at least one mark formed by the mark forming method as claimed in claim 1.

11. A paper carrying belt of an image forming apparatus that has at least one mark formed by the mark forming method as claimed in claim 1.

12. An intermediate transfer belt of an image forming apparatus that has at least one mark formed by the mark forming method as claimed in claim 1.

* * * * *